(12) United States Patent
Asai et al.

(10) Patent No.: US 6,581,735 B2
(45) Date of Patent: Jun. 24, 2003

(54) DRUM BRAKE DEVICE

(75) Inventors: Seiji Asai, Okazaki (JP); Takashi Ikeda, Owariasahi (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/025,995

(22) Filed: Dec. 26, 2001

(65) Prior Publication Data

US 2002/0092723 A1 Jul. 18, 2002

(30) Foreign Application Priority Data

Dec. 22, 2000 (JP) ........................... 2000-390389

(51) Int. Cl.[7] ................... F16D 51/22; F16D 65/22
(52) U.S. Cl. ........................ 188/325; 188/328
(58) Field of Search .................. 188/78, 325–341

(56) References Cited

U.S. PATENT DOCUMENTS

| | | | | |
|---|---|---|---|---|
| 5,070,968 A | * | 12/1991 | Evans | 188/79.64 |
| 5,275,260 A | * | 1/1994 | Evans et al. | 188/79.64 |
| 6,003,645 A | * | 12/1999 | Asai et al. | 188/328 |
| 6,223,869 B1 | * | 5/2001 | Asai et al. | 188/325 |

* cited by examiner

*Primary Examiner*—Christopher P. Schwartz
(74) *Attorney, Agent, or Firm*—Apex Juris, pllc; Tracy M Heims

(57) ABSTRACT

A drum brake device having a brake lever with sufficient rigidity, and securing a larger space at a central region of a brake in order to provide a long, effective brake lever stroke. A by-pass hole 60d, through which the shoe-hold pin 41 swingably rising from the back plate penetrates, is formed in the brake lever 60 positioned beneath the shoe web 20b of the brake shoe 20, and the bending sections 60e, 60f, 60g are integrally formed toward the back plate 10 at the outermost circumferential edge portion of the brake lever 60 surrounding the by-pass hole 60d.

7 Claims, 7 Drawing Sheets

DRUM BRAKE DEVICE

FIELD OF THE INVENTION

This invention relates to a drum brake device with a mechanical type actuator and especially relates to a structure wherein a larger space is reserved at a central region of the brake while maintaining the sufficient rigidity so as to extend an effective stroke range of the mechanical type actuator and to maintain the stability of the brake function.

DESCRIPTION OF PRIOR ART

An example of a drum brake device with a mechanical type actuator is disclosed in Publication Number JP09273573, which is hereby incorporated by reference. The structure and action of this type of the drum brake device is disclosed well in JP09273573. Therefore, an explanation here will be limited to a general description as to an overall structure and braking action of the drum brake device with reference to FIGS. 1–3 of this invention employing the same basic structure as in JP09273573.

Terms such as "upper" and "lower" or "left" and "right" used herein are explained with reference to FIG. 1. A back plate 10 is a disc-shape as a whole. An axle (not shown in the figures) penetrates into the central hole 10a formed in a center of the back plate 10, and four installation holes 10b are formed around the central hole 10a into which fixing members are inserted to fix the back plate 10 on a stationary part of a vehicle (not shown in the figures).

A pair of brake shoes 20, 30 comprise almost arc-shaped shoe rims 20a, 30a, shoe webs 20b, 30b fixed on inner circumferential surfaces of the shoe rims 20a, 30a designed to make T-shapes when viewed cross-sectionally, and linings 20c, 30c affixed on outer circumferential surfaces of the shoe rims 20a, 30a. One side surface of the shoe rims 20a, 30a is movably put on the back plate 10.

A wheel cylinder 11 of a hydraulic type actuator positioned between upper adjacent ends of the brake shoes 20, 30 is fixed on the back plate 10 by bolts, and a pair of pistons 11a (one in the right side only in FIG. 1) make slight contact with the upper end surfaces of the shoe webs 20b, 30b. Lower ends of the shoe webs 20b, 30b are supported by an anchor 10c fixed on the back plate 10 by a fixing means such as rivets.

A pair of shoe-hold mechanisms 40, 50 comprise shoe-hold pins 41, 51 and shoe-hold springs 42, 52. Top ends of the shoe-hold pins 41 and 51, rising from the back plate 10, retain the shoe-hold springs 42, 52, positioned on shoe webs 20b, 30b so as to contract the same to form almost a U-shape, thereby urging the brake shoes 20, 30 toward the back plate 10. Due to the above configuration, surfaces of the linings 20c, 30c are constantly parallelized, within a certain clearance, to an inner circumferential surface of a brake drum (not shown in the figures). Details of the shoe-hold mechanism 40 at the left side of the figures will be explained later.

A first strut 12 adjacent to the wheel cylinder 11 has a screw mechanism and is extended between both shoe webs 20b, 30b. Extending or shortening the first strut 12 adjusts the clearance between the linings 20c, 30c and the brake drum (not shown in the figures).

A pair of upper and lower shoe-return springs 15, 16 urging the pair of brake shoes 20, 30 to approach each other are stretched between both shoe webs 20b, 30b. This prevents dragging of the linings 20c, 30c when releasing the brake.

The structure of the mechanical type brake mechanism will be explained next.

A brake lever 60 superposed on the shoe web 20b of the left brake shoe 20, positioned between the back plate 10 and the shoe web 20b, but adjacent to the shoe web 20b, has a base portion 60a pivotally supported at a lower end portion of the shoe web 20b by a pin 61.

A free end 60b of the brake lever 60 is connected to a cable end 62a of a brake cable 62 functioning as a remote force transmitting member, and a projection 60c formed on an outer circumferential edge of the brake lever 60 near the free end 60b, just like shown in FIG. 1, abuts against an inner circumferential surface of the shoe rim 20a, thereby restricting a returning position of the brake lever 60.

A cable guide 10d is fixed on the back plate 10 to smoothly guide the brake cable 62, and a guide pipe 10e fixes one end of an outer casing.

The outer casing is a member to protect the brake cable 62 that may be directly exposed to outside air.

A pivot lever 14 superposed on the shoe web 30b of the right brake shoe 30, positioned between the back plate 10 and the shoe web 30b of the brake shoe 30, has a centrally located protuberance 14a pivotally supported at the central location of the shoe web 30b. A second strut 13 is extended between a lower end of the pivot lever 14 and the lower portion of the brake lever 60, and the upper end of the pivot lever 14 engages with a right end portion of the strut 12.

Details of the shoe-hold mechanism 40 at the left side of FIG. 1 will be explained with reference to the FIG. 8.

One end of which has a head 41b wherein the head declines or slopes to meet the stem of the shoe-hold pin in order to allow the pin to swingably move, the other end of which has an enlarged head 41c in order to fix the shoe-hold spring 42.

The head 41b at one end of the shoe-hold pin 41 swingably engages with an engagement hole 10f formed in the back plate 10, and the head 41c at the other end of the shoe-hold pin 41 penetrates through a by-pass hole 20d formed in the shoe web 20b and a by-pass hole 42b formed in a bottom branch 42a of the shoe-hold spring 42, wherein a top branch 42c of the shoe-hold spring 42 facing the bottom branch 42a of the shoe-hold spring 42 is fixed by the shoe-hold pin 41.

As such, the brake shoe 20 is resiliently supported on the back plate 10.

In order to keep a larger space at a central region of the brake, the brake lever 60 is positioned such that its outer circumferential edge is adjacent to the stem 41a of the shoe-hold pin 41.

An explanation as to an automatic shoe clearance adjustment mechanism automatically adjusting a clearance between the linings 20c, 30c and the brake drum (not shown in the figures) and an automatic stroke adjustment mechanism automatically adjusting a stroke of the brake lever 60 according to the lining wear of the linings 20c, 30c is omitted since it is not directly related to the concept of this invention.

In addition, the automatic stroke adjustment mechanism is configured in the second strut 13, and an explanation as to its structure and action is disclosed in Publication Number JP10110758 which is hereby incorporated by reference. Braking action of the brake device with the above-structure will be explained with reference to FIG. 1.

A hydraulic actuator action will be explained first.

If a wheel cylinder 11 is pressurized to push both pistons (where only right half of the wheel cylinder 11 with a piston 11a is shown in FIG. 1), the brake shoes 20, 30 move outward with a point of abutment with the anchor 10c as a pivot point, and the linings 20c, 30c frictionally engage with the brake drum (not shown in FIG. 1).

Either brake shoe 20 or brake shoe 30, where the brake drum moves in a rotational direction about the brake shoe, functions as a leading shoe, and the remaining brake shoe of the two, not positioned in a rotational direction, functions as a trailing shoe, thereby operating and functioning as a leading trailing type drum brake device with a stable braking effect.

A mechanical type actuator action will be explained next. If the free end 60b of the brake lever 60 is pulled via a brake cable 62, the brake lever 60 rotates clockwise with the pin 61 as a pivot point, and the operation force is transmitted to the second strut 13, the pivot lever 14, and the first strut 12 respectively so as to move the left brake shoe 20 outward to cause a frictional engagement with the brake drum.

Simultaneously, the right brake shoe 30 moves outward via the protuberance 14a of the pivot lever 14 to cause a frictional engagement with the brake drum.

An outward force acts on the lower end of the left brake shoe 20 via the pin 61.

A frictional force of either the brake shoe 20 or the brake shoe 30 working as a primary shoe in relation to a rotational direction of the brake drum is transmitted to the remaining brake shoe of the two working as a secondary shoe via the first strut 12 so as to cause a braking force, thereby functioning as a duo servo type drum brake device with a highly effective braking force.

Accordingly, this drum brake device is defined to be a dual mode type drum brake device.

A conventional drum brake device has the following drawbacks: Recently, for safety reasons, the number of vehicles utilizing anti-lock brake control devices, has been increasing.

For a vehicle with the anti-lock brake control device, a sensor wheel rotating together with the brake drum is positioned at the central region of the brake, and a sensor faces an outer circumferential surface of the sensor wheel with a certain clearance. A body of the sensor penetrates through a through hole 10g (see FIG. 1) formed in the back plate 10 to be installed. Accordingly, unless a sufficiently effective brake lever stroke is reserved, the sensor may be damaged.

In a four-wheel drive vehicle, because a hub portion of the brake drum is positioned at the central region of the brake, an insufficient effective brake lever stroke, just like the above case, may damage the hub portion and the brake lever.

If the hub portion of the brake drum is positioned at the central region of the brake, and in order to avoid any interference with the same, pitches of the installation holes on the back plate become wider requiring a sufficient space necessary for installing fixing members. Considering the above drawbacks, it is desirable to keep a larger space at the central region of the brake.

For example, U.S. Pat. No. 3,255,849 and Publication Number JP58052342U disclose the structure employing a means to keep a larger space at the central region of the brake.

In these configurations, the shoe-hold pin rises from the back plate and freely passes or penetrates through the by-pass hole. A flat brake lever plate is positioned beneath the shoe web and parallel to the back plate with a certain clearance, and the outermost circumferential edge of the brake lever approaches the inner circumferential surface of the shoe rim.

The brake lever disclosed in the drawings of U.S. Pat. No. 3,255,849 only suggests a by-pass hole on a member adjacent to a shoe web, from which a shoe-hold pin is freely penetrated through.

However, the structure of this conventional drum brake device has the following drawbacks:

The shoe-hold pin ha s a semi-sphere head at one end of which is swingably engaged with a back plate. Therefore, there is no guarantee of maintaining a stable condition.

As the lining wears, the shoe-hold pin leans towards the outside of the brake because of the sloped surface of the head. When the brake lever is in operation, if collision of the brake lever collides and the shoe-hold pin cause a serious damage to both. Therefore, in order to satisfy the above requirements, the by-pass hole of the brake lever must be designed to be a sufficient size. As such, an inner circumferential line of the brake lever at the brake center side is necessarily projected resulting in diminishing the space at the central region of the brake.

A large by-pass hole needs to be formed in the flat brake lever, which reduces the strength of the brake lever.

Because of this larger hole, a section of the brake lever surrounding the by-pass hole needs to be wider, which also contributes to the diminished space at the central region of the brake.

A reinforcement plate may be added to the brake lever, or the brake lever may be forged or cast, thus thickening the surrounding portion of the by-pass hole so as to increase the strength of the brake lever. However, this adds an additional member or an additional process, making the processing more complex and increases the manufacturing cost. This invention was made to remove the aforementioned drawbacks. Also this invention was made to increase the rigidity of the brake lever with a simpler structure and to achieve a longer, effective brake lever stroke by way of securing a larger space in the brake.

SUMMARY OF THE INVENTION

This invention is a drum brake device comprising a brake shoe being movably disposed parallel to a surface on a fixed back plate, a brake lever superposed on a shoe web of the brake shoe, Positioned between the back plate and the shoe web, but adjacent to the shoe web, a base end of which is pivotally supported at one end of the shoe web, a shoe-hold mechanism, composed of a shoe-hold pin, rising from the back plate, and a shoe-hold spring, laid on the brake shoe, the shoe-hold pin contracting the shoe-hold spring so as to urge the brake shoe toward the back plate and to hold the brake shoe, and a remote control device pulls a free end of the brake lever to cause a frictional engagement between the brake shoe and a brake drum. A by-pass hole is formed in the brake lever through which the shoe-hold pin penetrates and a bending section extending toward the back plate is integrally formed at an outermost circumferential edge of a brake lever surrounding the by-pass hole.

This invention further is the drum brake device as above, wherein the bending section is a substantially L-shaped angle member.

The invention still further is the drum brake device as above, wherein the bending section is a substantially reversed C-shaped sulciform member.

The invention still further is the drum brake device as above, wherein the bending section is a folded and superposed section.

This invention still further is a drum brake device comprising a brake shoe being movably disposed parallel to a surface on a fixed back plate, a brake lever superposed on a shoe web of the brake shoe, positioned between the back plate and the shoe web, but adjacent to the shoe web, a base end of which is pivotally supported at one end of the shoe web, a shoe-hold mechanism, composed of a shoe-hold pin, rising from a back plate, and a shoe-hold spring, laid on the brake shoe, the shoe-hold pin contracting the shoe-hold spring so as to urge the brake shoe toward the back plate and to hold the brake shoe, and a remote control device pulls a free end of the brake lever to cause a frictional engagement between the brake shoe and a brake drum. A tube section, through which the shoe-hold pin penetrates, is integrally formed in the brake lever toward the back plate.

This invention yet further is the drum brake device as above, wherein the tube section of the brake lever is tapered to gradually become narrower toward the back plate.

BRIEF DESCRIPTION OF DRAWINGS

The above and other objects and advantages of the present invention will become readily apparent by reference to the following detailed description when considered in conjunction with the accompanying drawings.

DETAILED DESCRIPTION OF THE PREFERRED EMBODIMENTS

An example of a drum brake device utilizing this invention is explained below with reference to the accompanied drawings. For the purpose of explanation, the same reference numbers as in the aforementioned conventional art shown in FIGS. 1–3 will be assigned to identical parts or sites having the same functions as described in the following example. Furthermore, the explanation of the components and the brake action are omitted.

Figure 1:
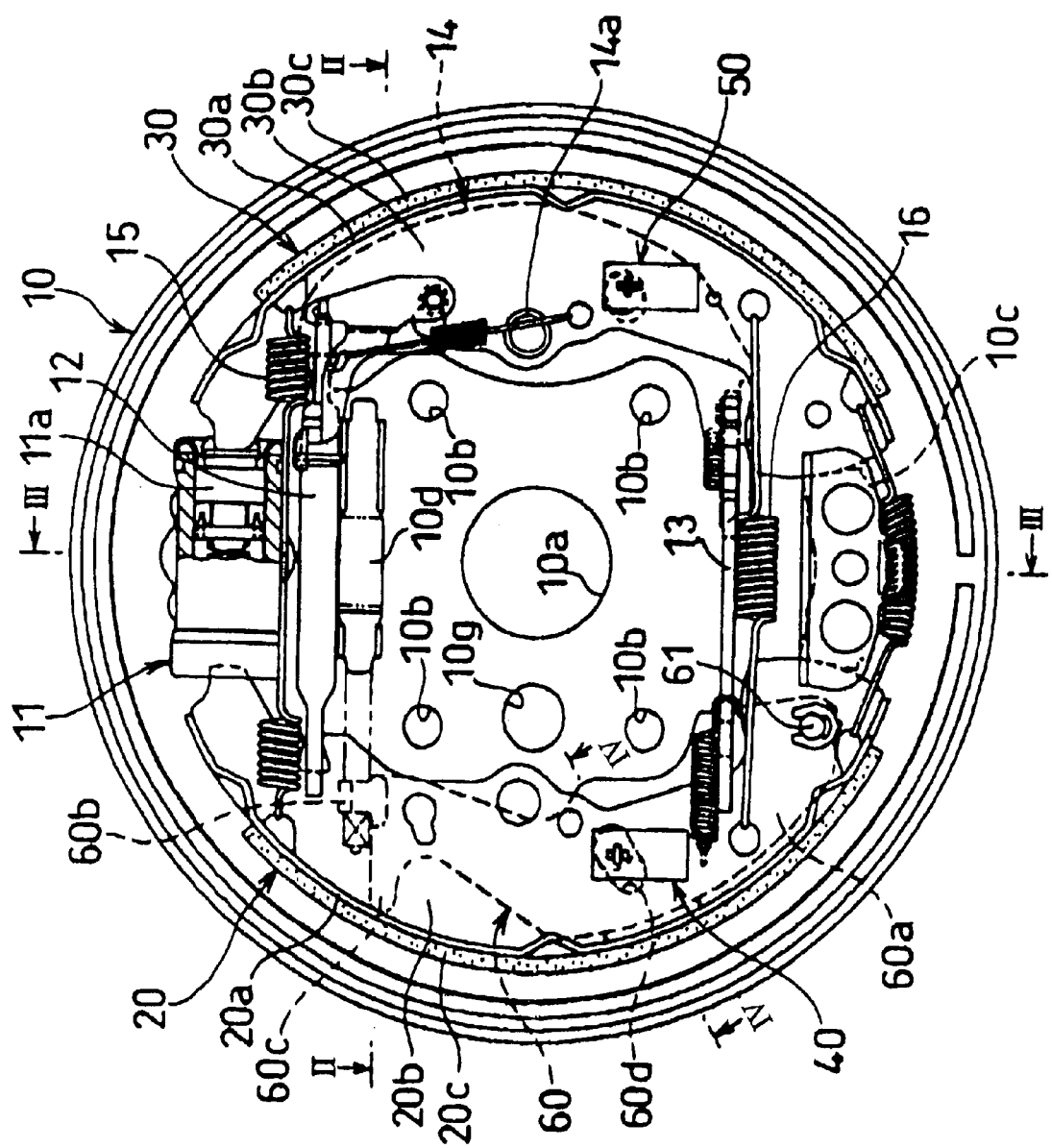
FIG. 1 is a plan view of a drum brake device as to Example 1 of this invention.
Figure 2:
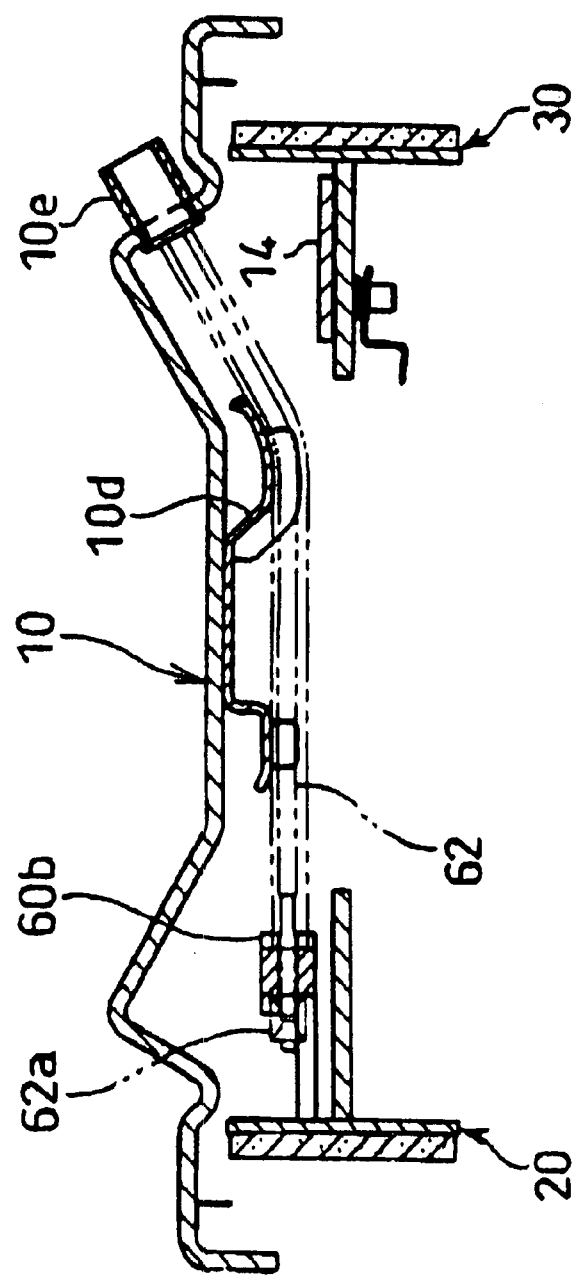
FIG. 2 is a cross-section view of FIG. 1 taken along the line II—II.
Figure 3:
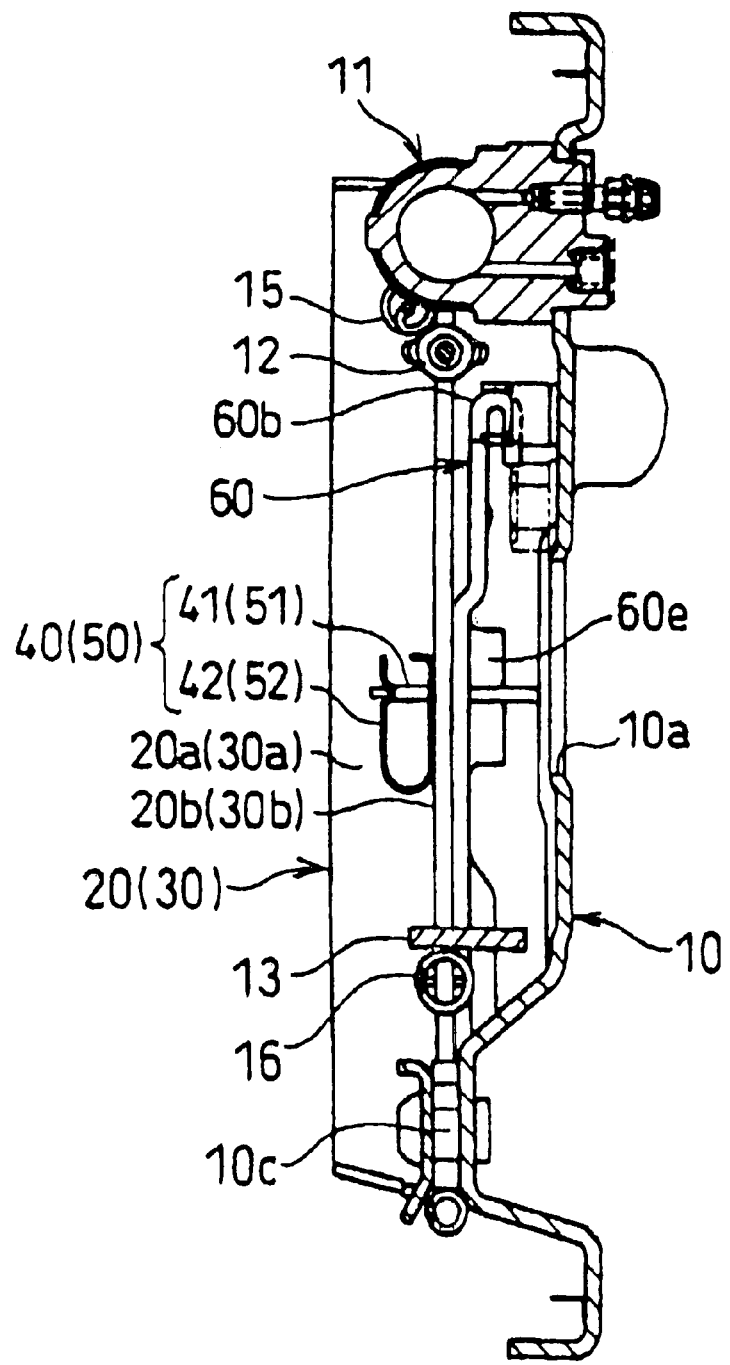
FIG. 3 is a cross-section view of FIG. 1 taken along the line III—III.
Figure 4:
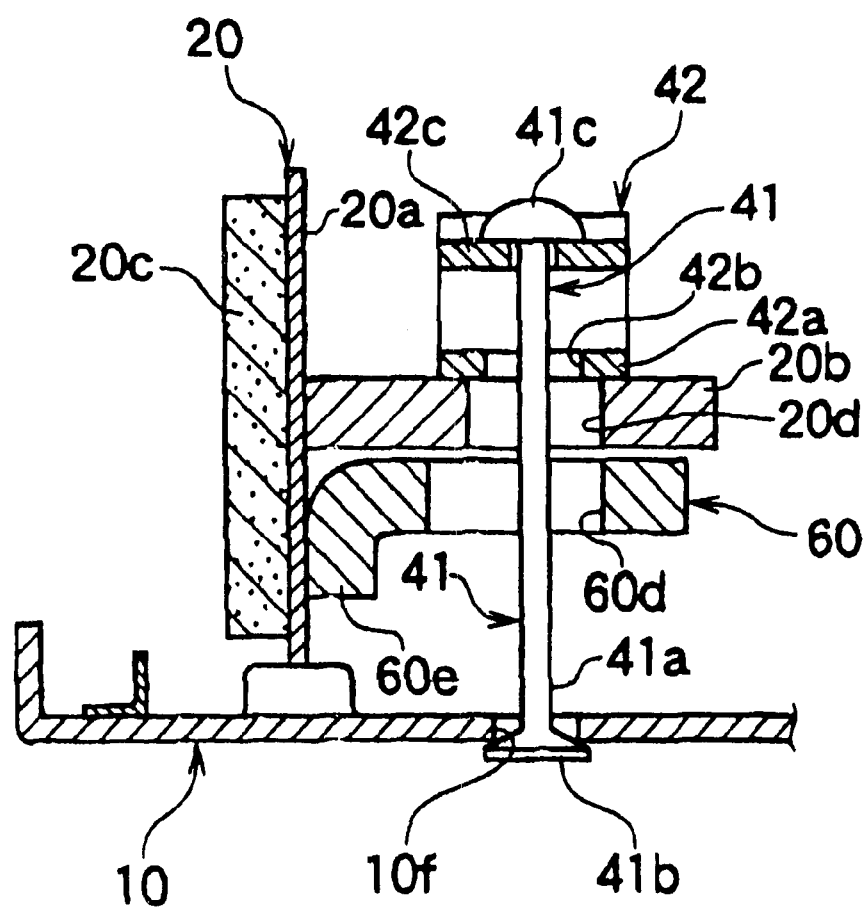
FIG. 4 is a cross-section view of FIG. 1 taken along the line IV—IV.

Example 1 of this invention will be explained with reference to FIG. 4 in addition to FIGS. 1 and 3. Only the shape of the brake lever 60 is different from the above-described conventional art. Therefore, the same reference numbers therein will be assigned to identical parts or sites having the same functions as described in the conventional art and the explanation of which will be omitted here.

A by-pass hole 60d, through which the shoe-hold pin 41 rising from the back plate penetrates, is formed in the brake lever 60 superposed on the shoe web 20b of the brake shoe 20, positioned between the back plate 10 and the shoe web 20b, but adjacent to the shoe web 20b, and the bending section 60e extending toward the back plate is an almost L-shaped angle member integrally formed on an outer circumferential edge of the brake lever 60 at the side of the by-pass hole 60d. Accordingly, instead of the conventional projection 60c of the brake lever 60, the bending section 60e may restrict a returning position of the brake lever 60 and may approach and abut against a shoe rim 20a. Accordingly, while the brake lever 60 maintains a sufficient rigidity, it secures a larger space at a central region of a brake and provides a long effective brake lever stroke of the brake lever 60. Since a space at the central region of the brake is larger, assembly of the brake device on the vehicle is facilitated.

Modified examples of Example 1 will be explained with reference to FIGS. 5 and 6.

Figure 5:
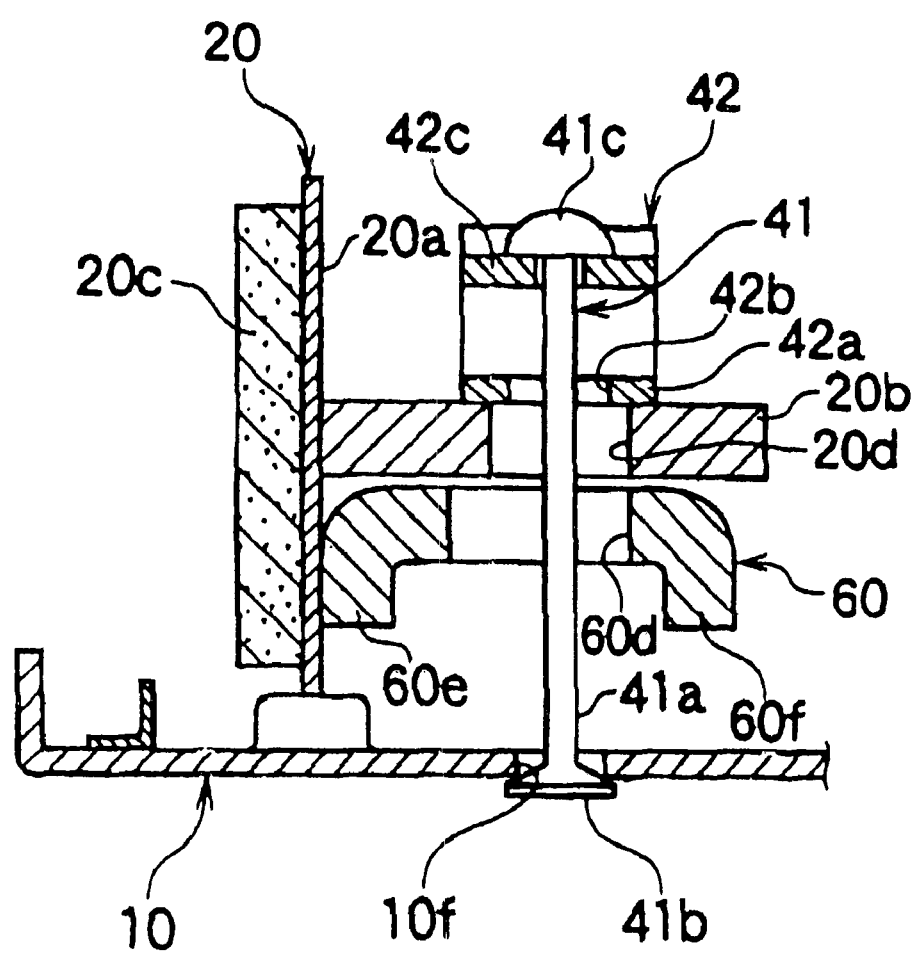
FIG. 5 is a cross-section view of one modification in FIG. 4.

In one modified example shown in FIG. 5, a bending section 60f extending toward the back plate 10 is also integrally formed on a front circumferential edge of the brake lever 60 and is designed to be an almost reversed C-shaped sulciform. While the brake-leyer 60 maintains more rigidity, the overall width of the brake lever 60 may be shortened.

Figure 6:
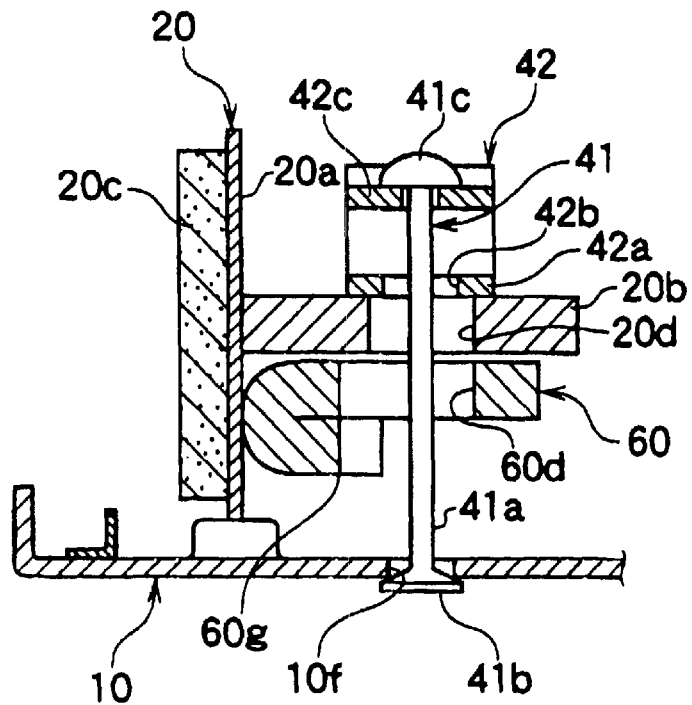
FIG. 6 is a cross-section view of another modification in FIG. 4.

In another modified example shown in FIG. 6, the bending section 60g is integrally formed on an outer circumferential edge of the brake lever 60 and is bent and superposed on the surface at the back plate side 10. Again in this configuration, while the brake lever 60 maintains more rigidity, overall width of the brake lever 60 may be shortened, and a large space at a central region of a brake may be secured.

Figure 7:
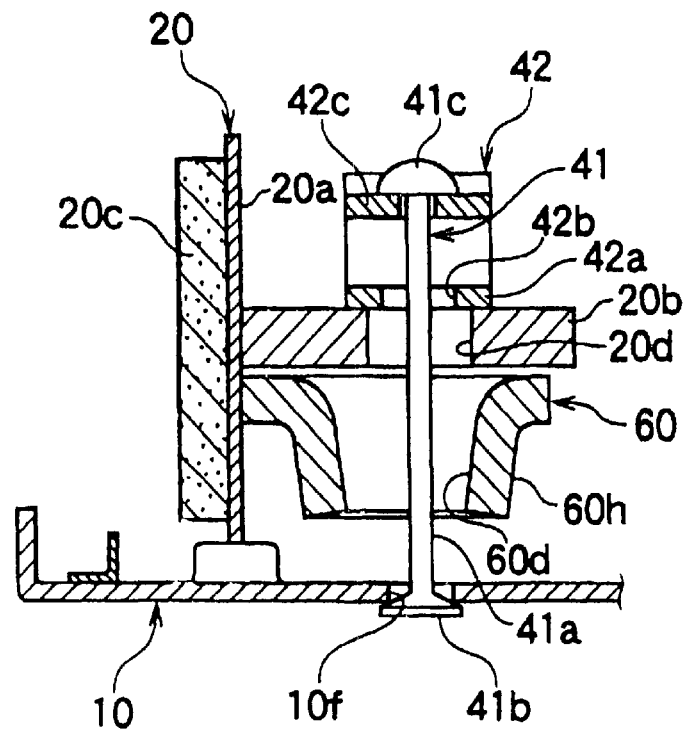
FIG. 7 is a cross-section view of a shoe-hold mechanism in Example 2 of this invention.
Figure 8:
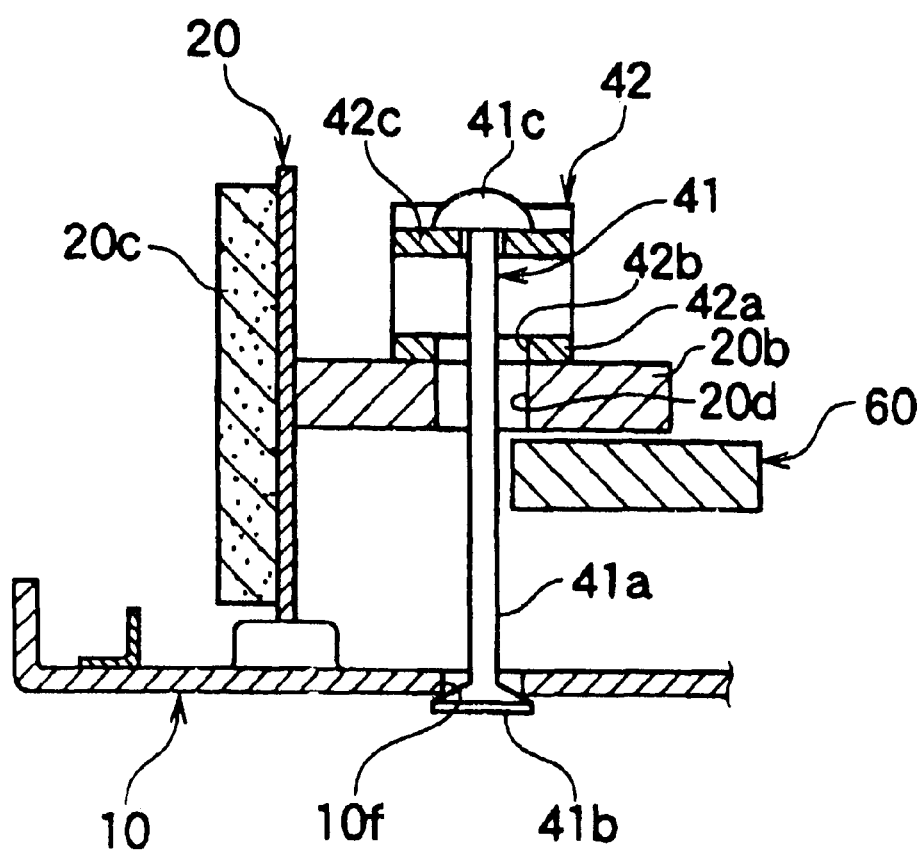
FIG. 8 is a cross-section view of a shoe-hold mechanism of the prior art on which this invention is based.

Example 1 and modified examples, all disclose examples of an integral type of bending sections 60e, 60f, 60g integrally formed and extending from the circumferential edge of the brake lever 60. Example 2 will be explained with reference to FIG. 7.

The brake lever 60 of Example 2 is characterized in that a tube section 60h, through which a shoe-hold pin 41 penetrates, is integrally formed therein toward the back plate 10. Accordingly, in this configuration, since the rigidity of the tube section forming the by-pass hole 60d may be increased, overall width of the brake lever 60 may be shortened, and a large space at a central region of a brake may be secured.

The bending sections 60e, 60f, 60g and the tube section 60h may integrally be formed by press, which simplifies the processing and is advantageous with respect to its manufacturing cost. The tube section 60h may be a cylindrical tube or it may be a tapered shape, gradually narrowing down toward the back plate 10. If the tube is tapered the tube sections can be made by press forming, wherein upper and lower molds separate easily due to the tapered shape of the tube, thereby simplifying the manufacturing process and reducing manufacturing costs.

The above examples are limited to an application in a dual mode type drum brake device; however, application of this invention is not limited to the dual mode type drum brake, but may be used on other brakes as well. For example, it could be used on a publicly known leading-trailing type drum brake, duo servo type drum brake device or a drum brake device with a single shoe as shown in Publication Number JP09324829.

Since the by-pass hole, through which the shoe-hold pin rising from the back plate penetrates, is formed in the brake lever plate superposed under the shoe web and parallel to the back plate, the brake lever may be designed to approach the inner circumferential surface of the shoe rim.

In order to increase the rigidity and to shorten the overall width of the brake lever, the angle or sulciform superposed bending section extending toward the back plate may integrally be formed at the outer end portion at the by-pass hole of the brake lever, and the tube section with the by-pass hole extending toward the back plate may integrally be formed. Accordingly, while the brake lever maintains sufficient rigidity, it secures a larger space at a central region of a brake and provides a longer effective brake lever stroke of the brake lever.

Accordingly, this configuration prevents the brake lever from colliding with sensors for anti-lock brakes and brake drum hubs during brake lever operation. Because a space at the central region of the brake is larger, assembly of the brake device on the vehicle is simplified.

The bending section and the tube section are to be integrally formed in the brake lever by press, which facilitates the processing and reduces the manufacturing cost.

This invention can be applied to various types of drum brakes including those employing a dual mode type, leading trailing type, duo servo type, and a type of a drum brake with single brake shoe, and provides a wide range of applicability.

It is readily apparent that the above-described invention is advantageous for use in wide commercial utility. It may be understood that the specific form of the invention hereinabove described is intended to be representative only, and certain modifications within the scope of these teachings will be apparent to those skilled in the art without departing from the spirit and scope of the invention.

Accordingly, reference should be made to the following claims in determining the full scope of the invention.

What we claim is:

1. A drum brake device comprising a brake shoe being movably disposed parallel to a surface on a fixed back plate, a brake lever superposed on a shoe web of the brake shoe, positioned between the back plate and the shoe web, but adjacent to the shoe web, a base end of which is pivotally supported at one end of the shoe web, a shoe-hold mechanism, composed of a shoe-hold pin, rising from the back plate, and a shoe-hold spring, laid on the brake shoe, said shoe-hold pin contracting said shoe-hold spring so as to urge the brake shoe toward the back plate and to hold the brake shoe, and a remote control device which pulls a free end of said brake lever to cause a frictional engagement between the brake shoe and a brake drum, wherein a by-pass hole is formed in said brake lever through which said shoe-hold pin penetrates and a bending section extending toward the back plate is integrally formed at an outermost circumferential edge of said brake lever surrounding the by-pass hole.

2. The drum brake device as claimed in claim 1, wherein the bending section defines a substantially L-shaped angle member.

3. The drum brake device as claimed in claim 1, wherein the bending section defines a substantially reversed C-shaped sulciform member.

4. The drum brake device as claimed in claim 1, wherein the bending section defines a folded and superposed section.

5. A drum brake device comprising a brake shoe being movably disposed parallel to a surface on a fixed back plate, a brake lever superposed on a shoe web of the brake shoe, positioned between the back plate and the shoe web, but adjacent to the shoe web, a base end of which is pivotally supported at one end of the shoe web, a shoe-hold mechanism, composed of a shoe-hold pin, rising from the back plate, and a shoe-hold spring, laid on the brake shoe, said shoe-hold pin contracting said shoe-hold spring so as to urge the brake shoe toward the back plate and to hold the brake shoe, and a remote control device which pulls a free end of said brake lever to cause a frictional engagement between the brake shoe and a brake drum, wherein a tube section, through which said shoe-hold pin penetrates, is integrally formed in said brake lever toward the back plate.

6. The drum brake device as claimed in claim 5, wherein the tube section of the brake lever is tapered to gradually become narrower toward the back plate.

7. The drum brake device as claimed in claim 5, wherein said tube section defines an annular passageway throughwhich said shoe-hold pin passes.

* * * * *